United States Patent

Baechle et al.

[15] 3,662,631

[45] May 16, 1972

[54] APPARATUS FOR TRANSFERRING AND MACHINING WORKPIECES

[72] Inventors: Hans J. Baechle; James O. Holtey, both of Rockford, Ill.

[73] Assignee: The Ingersoll Milling Machine Company, Rockford, Ill.

[22] Filed: Aug. 12, 1970

[21] Appl. No.: 63,087

[52] U.S. Cl. ..............................................................82/2.5
[51] Int. Cl. .....................................................B23b 15/00
[58] Field of Search ........................82/2.5; 29/27 R; 214/1 B

[56] References Cited

UNITED STATES PATENTS 2,371,906    3/1945    Millholland..............................82/2.5

Primary Examiner—Gerald A. Dost
Attorney—Wolfe, Hubbard, Leydig, Voit & Osann, Ltd.

[57] ABSTRACT

A cylinder whose ends are to be machined is first centered in an accurately located position by cones on a loading carriage which thereafter advances the cylinder from a loading station to a machining station where the cylinder is clamped radially and held in its accurately located position prior to release of the cones and retraction of the loading carriage to the loading station. After the ends of the cylinder have been machined by cutters supported on a pair of tool heads, the cylinder is unclamped and is transferred laterally out of the machining station with one of the tool heads as an incident to the normal retraction of such head. During the next advance of the loading carriage to deliver a succeeding cylinder to the machining station, a fork lift on the carriage picks up the machined cylinder from its transferred position adjacent the retracted tool head and, when the loading carriage is subsequently retracted, carries the machined cylinder back to an unloading station adjacent the loading station.

17 Claims, 27 Drawing Figures

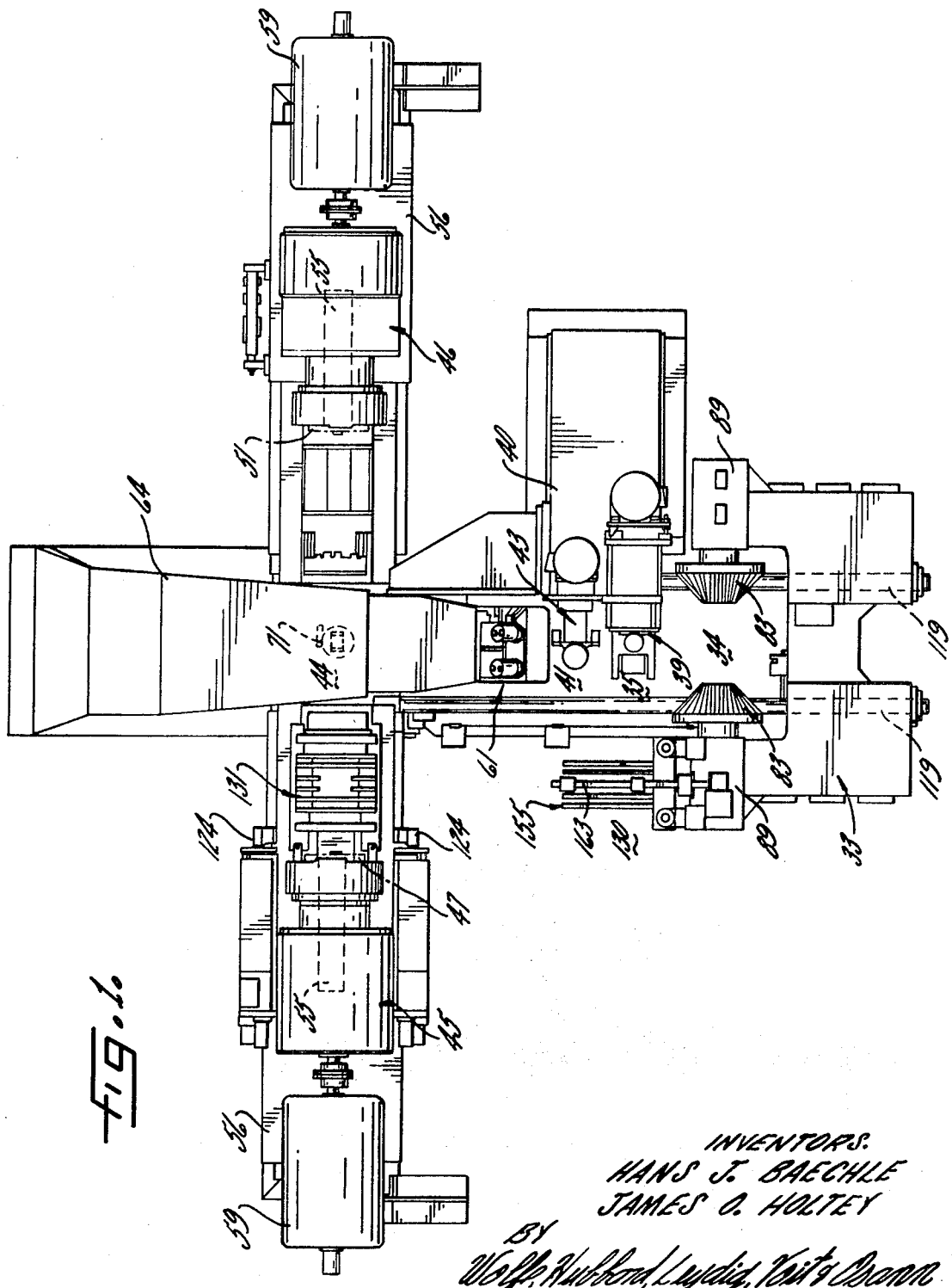

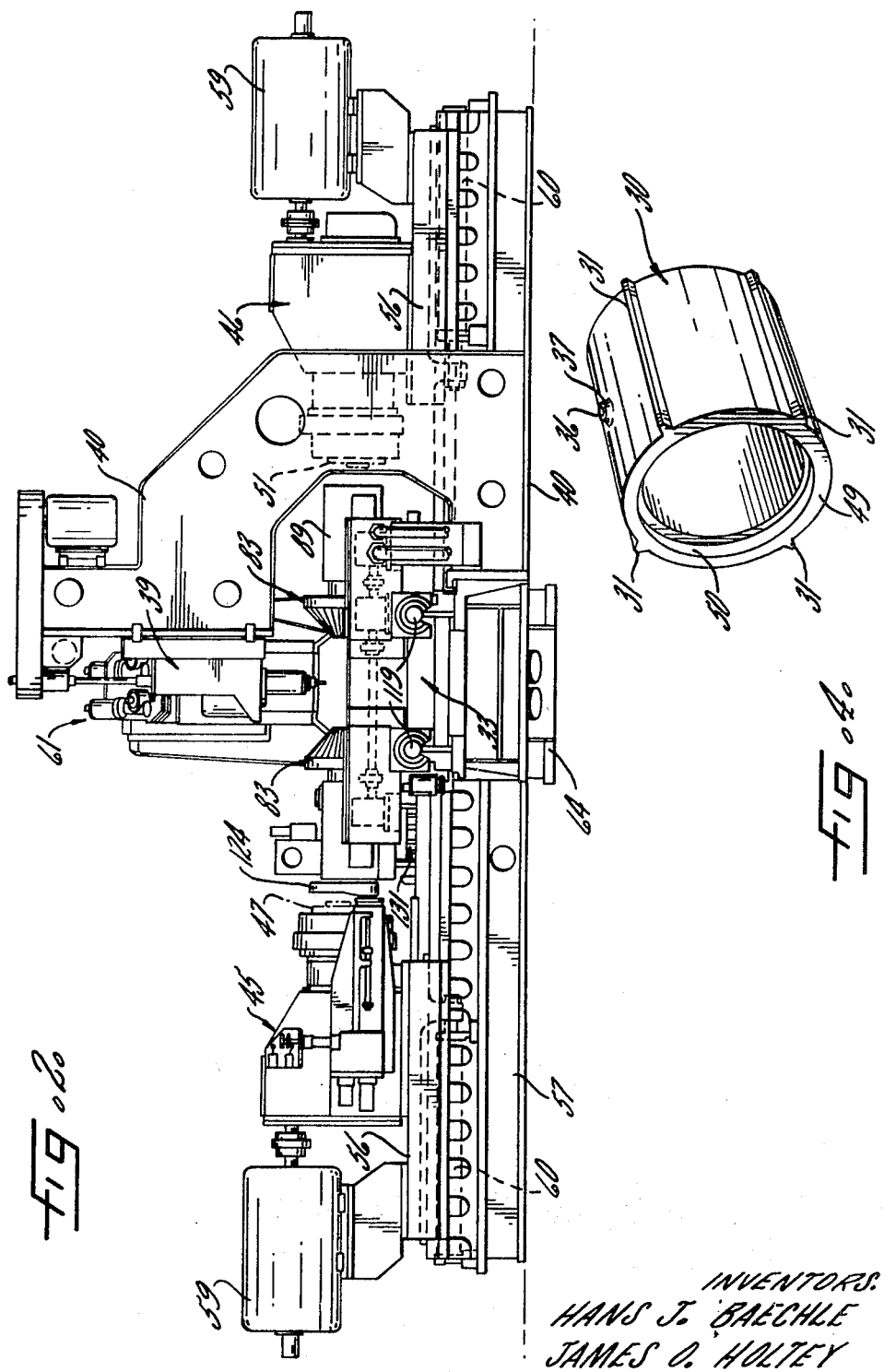

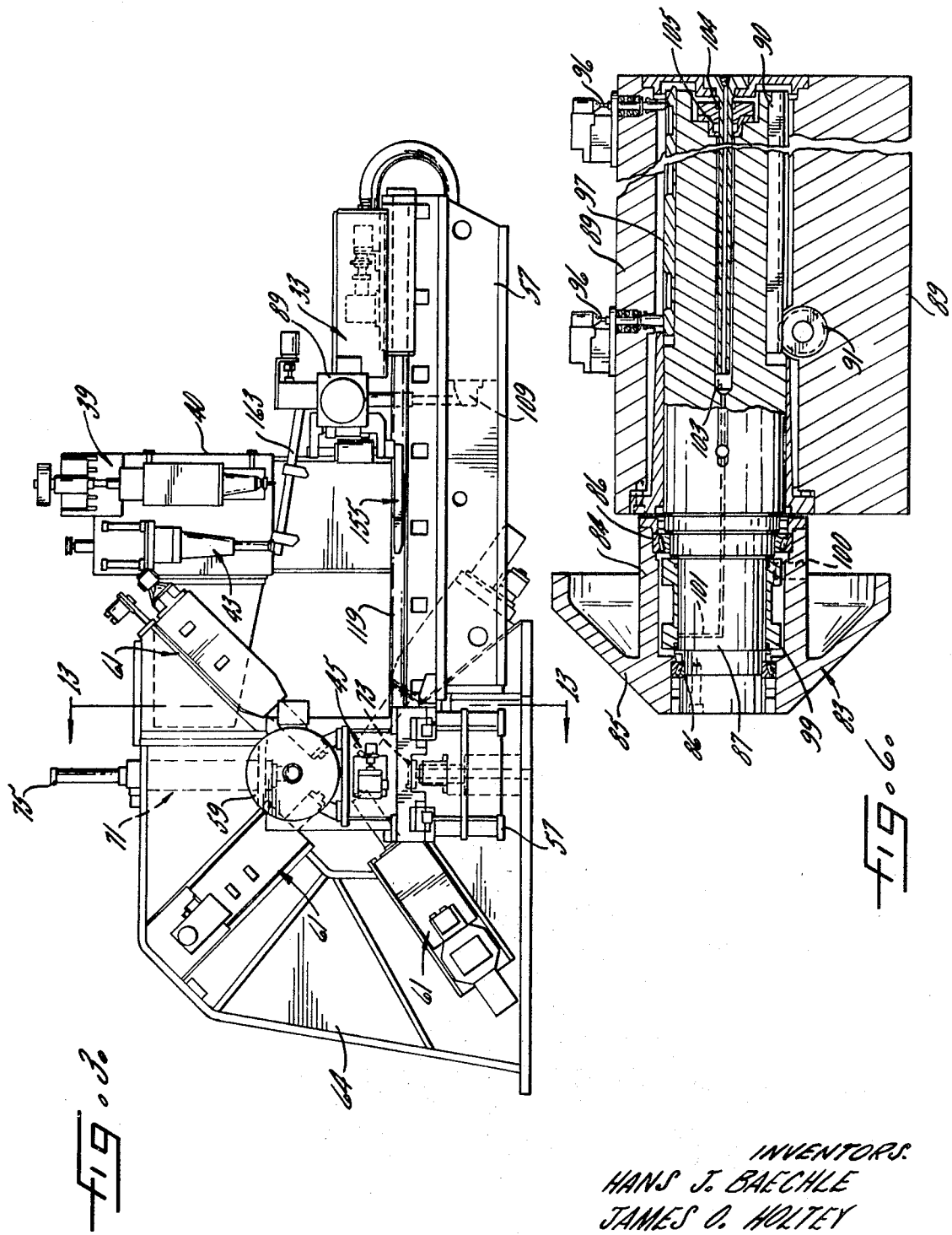

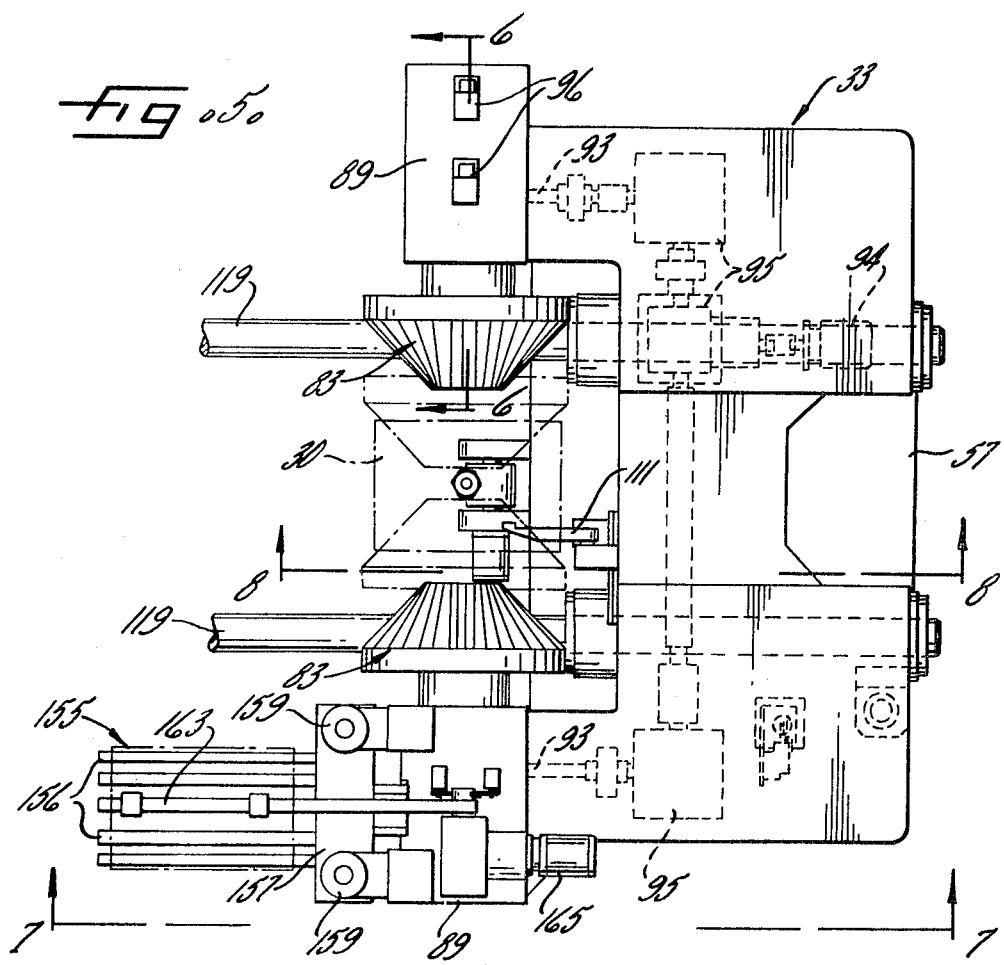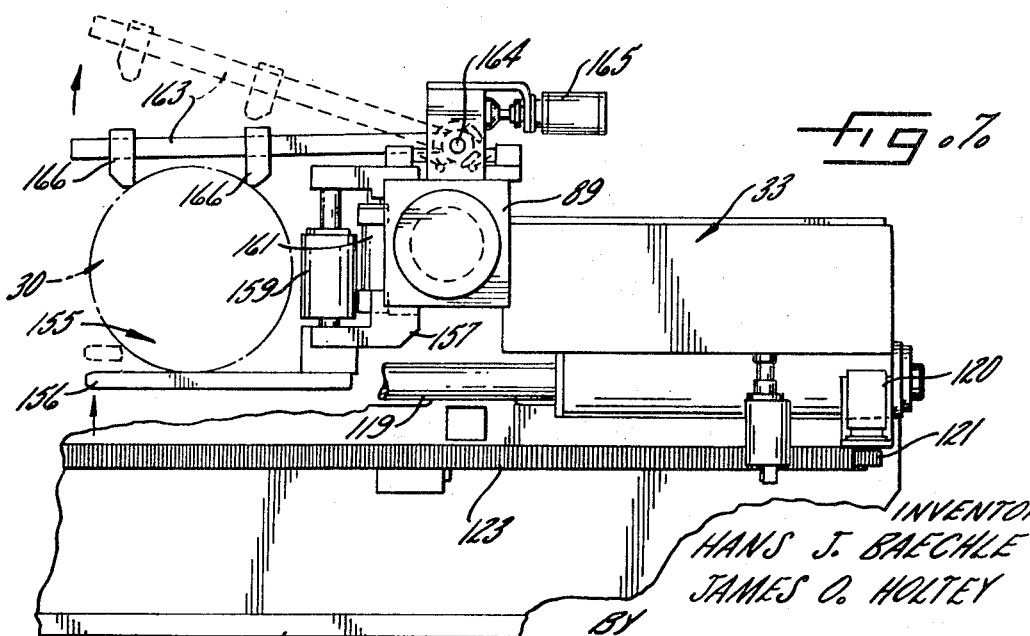

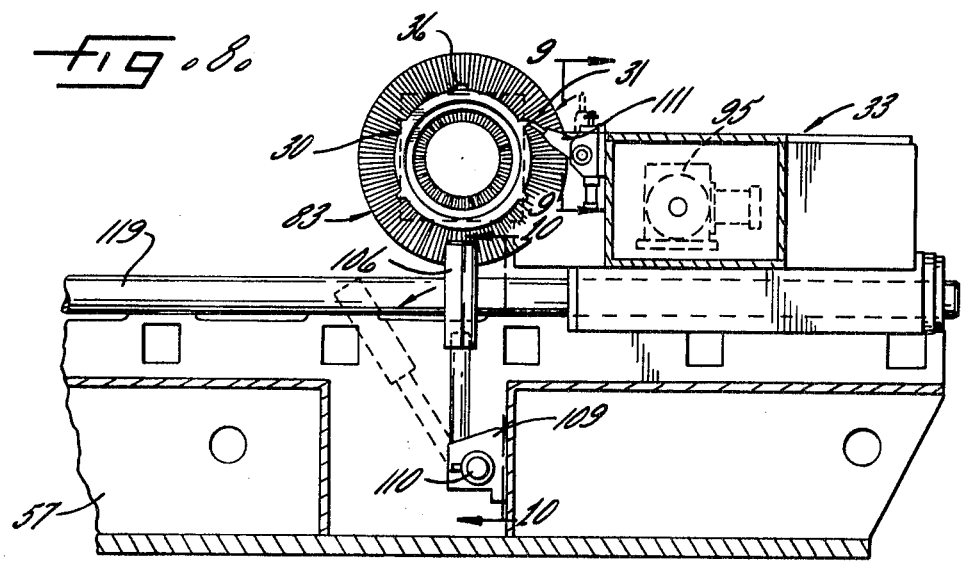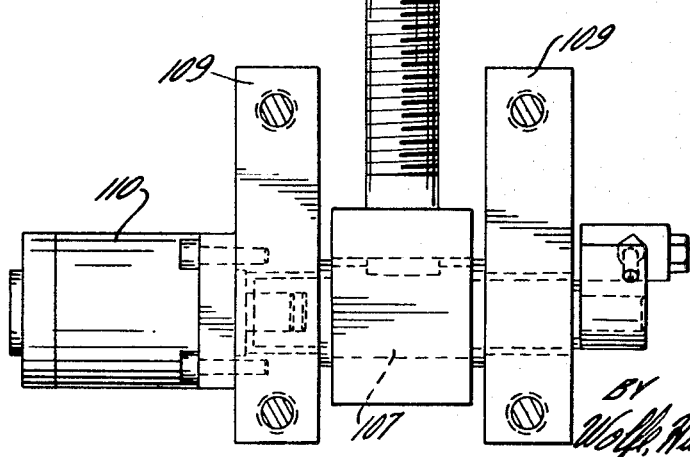

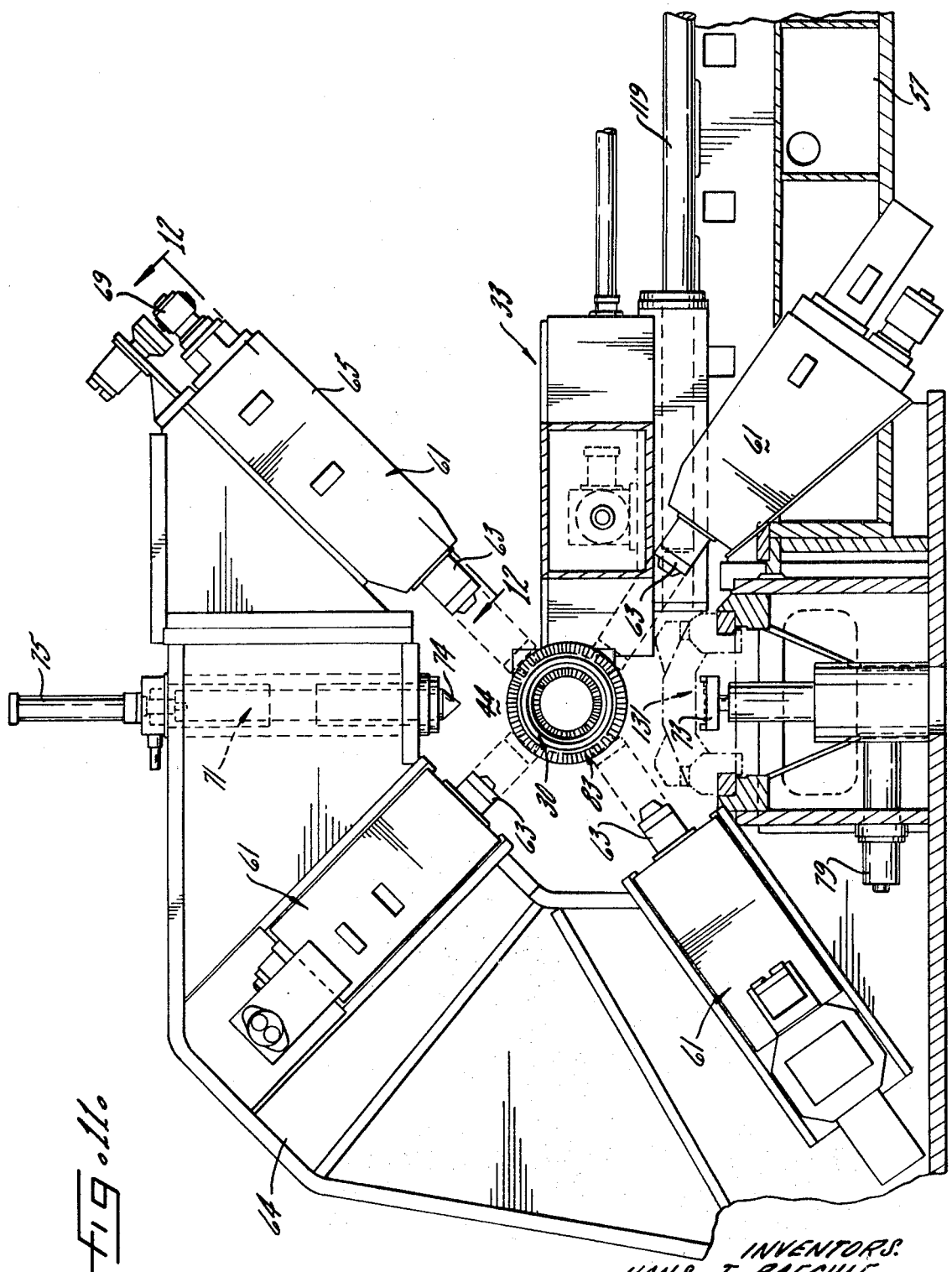

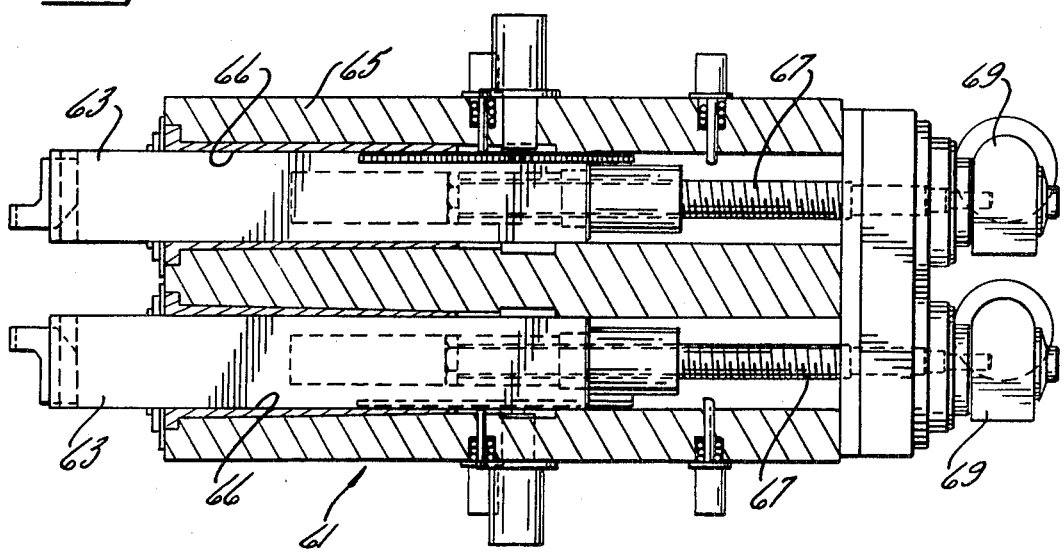
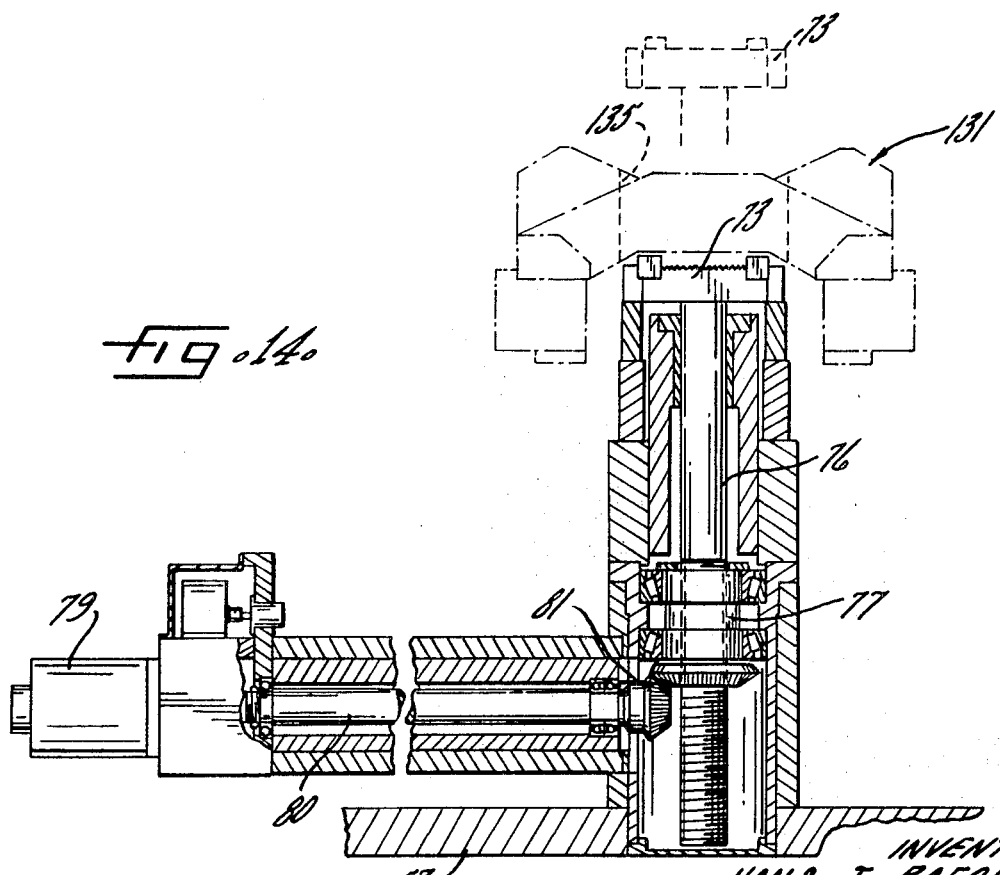

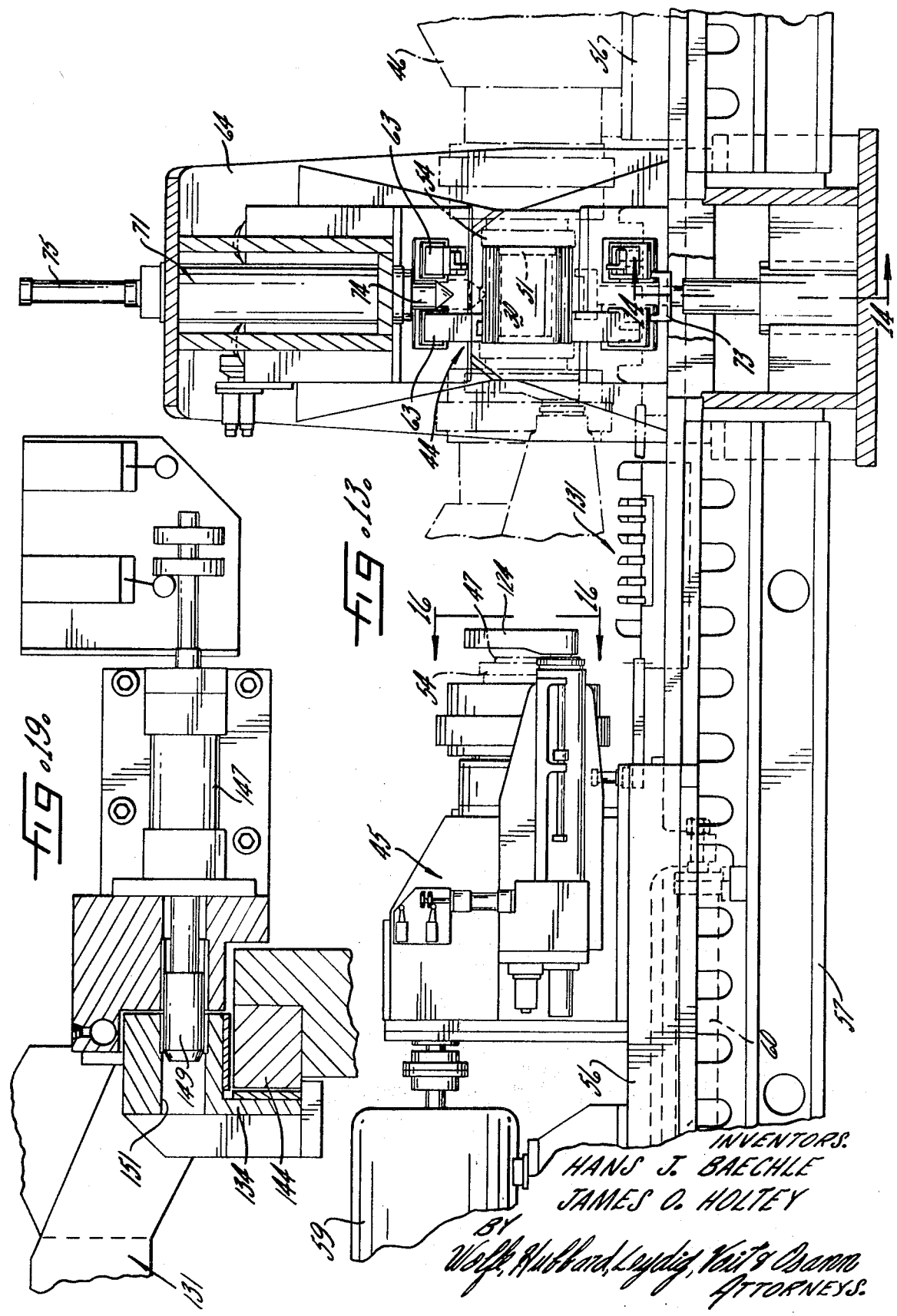

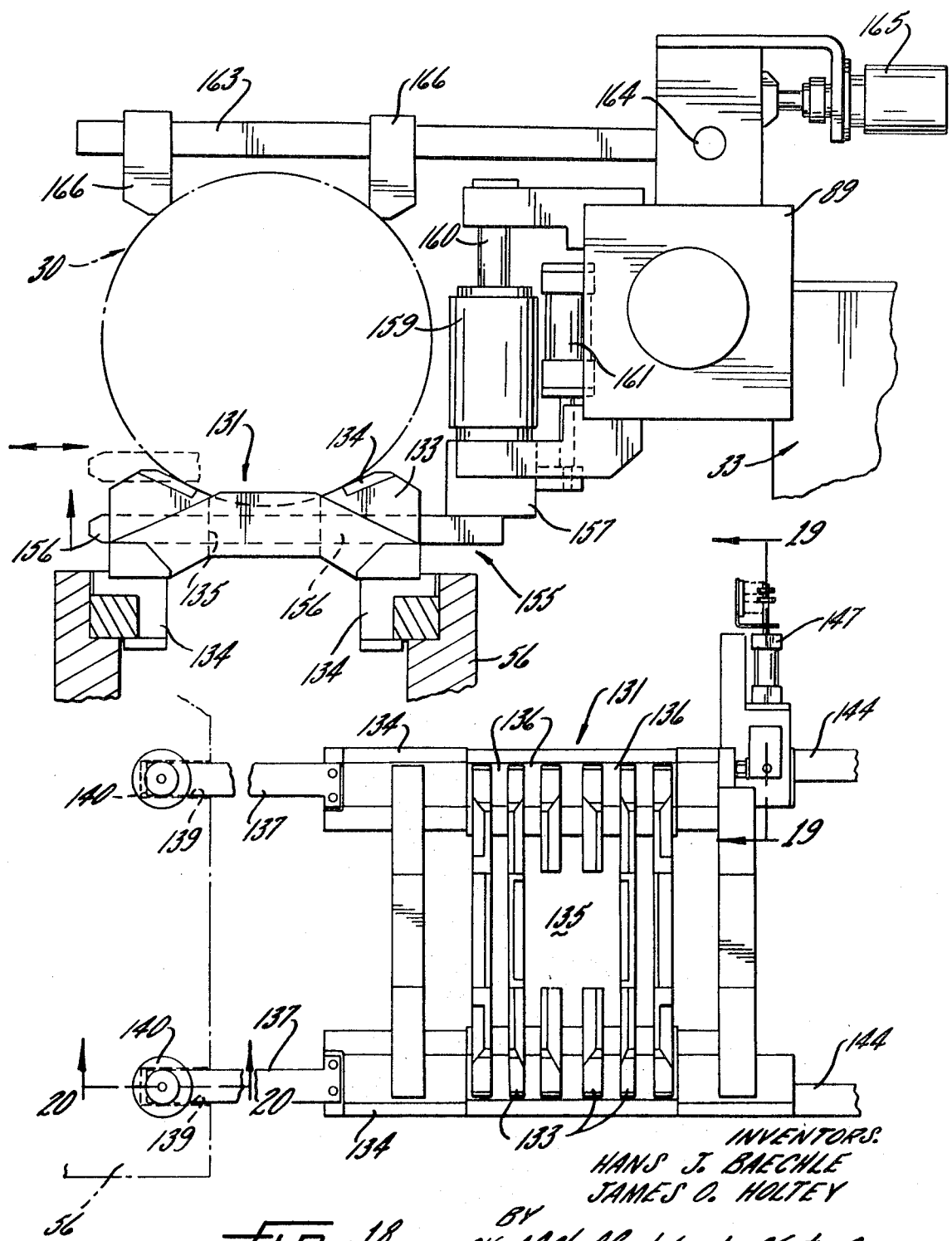

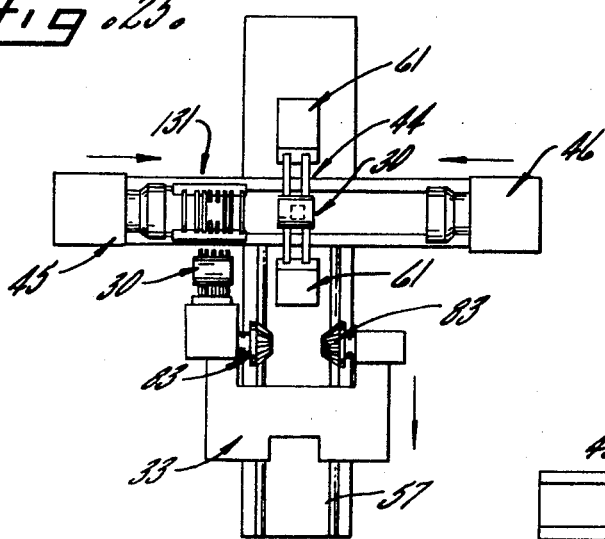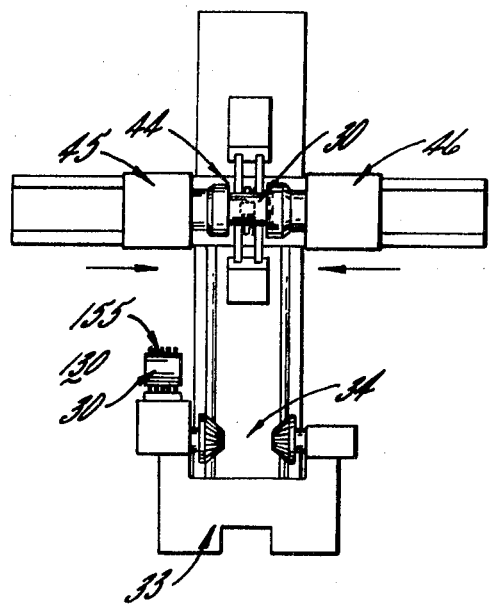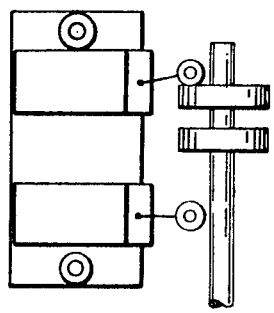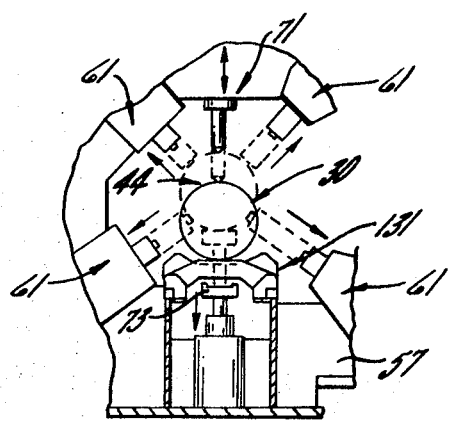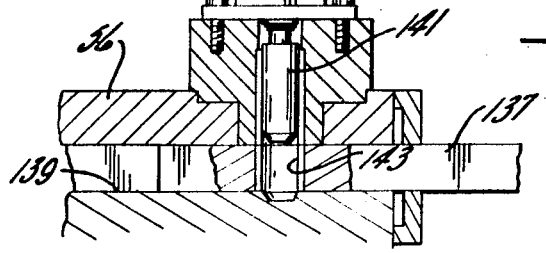

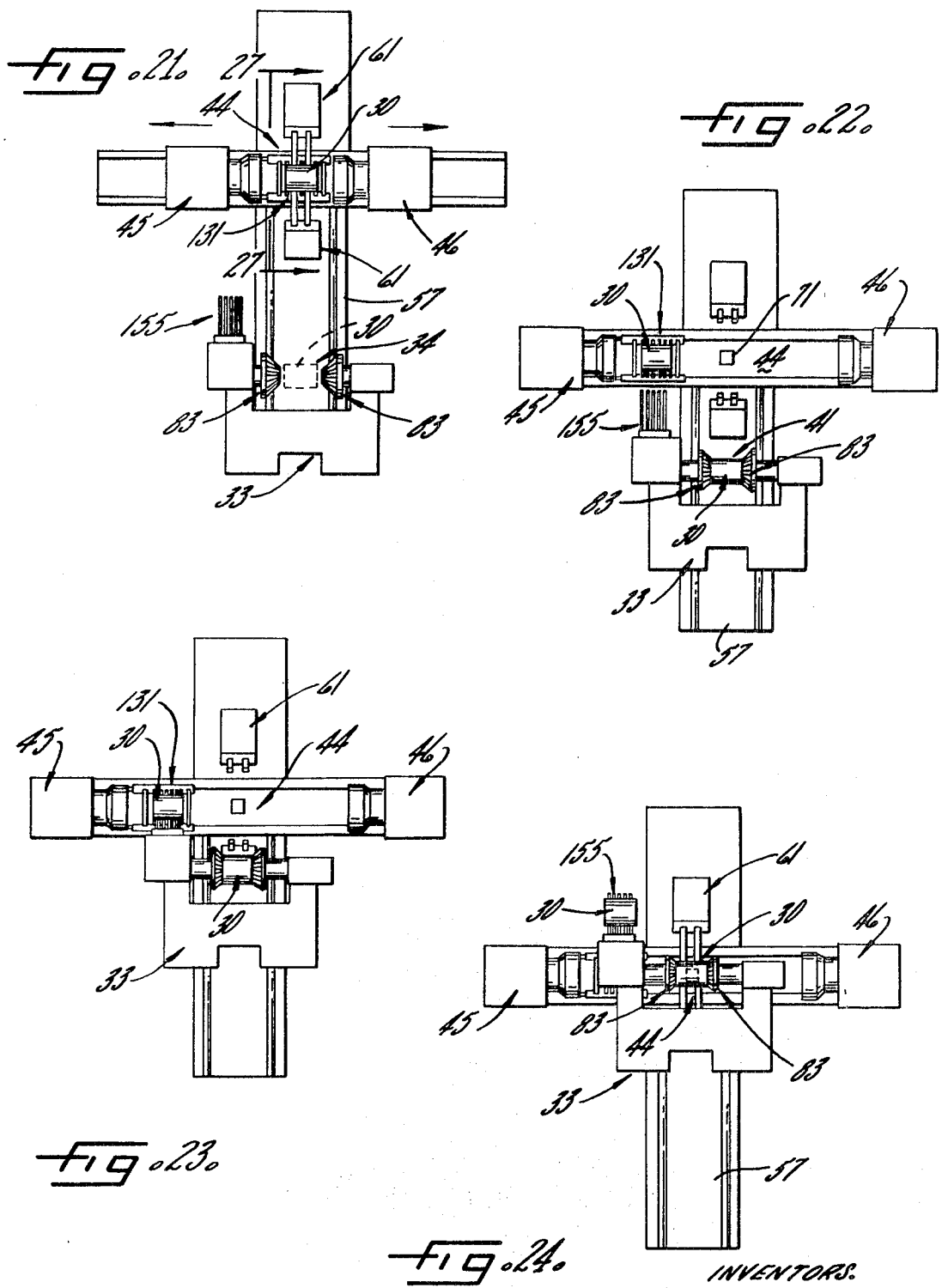

3,662,631

1

APPARATUS FOR TRANSFERRING AND MACHINING WORKPIECES

BACKGROUND OF THE INVENTION

This invention relates to apparatus for transferring and machining workpieces and, more particularly, to apparatus of the type including a tool-supporting head adapted to be sequentially advanced toward and retracted away from a machining station to bring the tool into and out of operative position for machining a workpiece clamped in the machining station.

SUMMARY OF THE INVENTION

The primary aim of the present invention is to provide new and improved apparatus of the above character which greatly facilitates automatic transfer of the workpieces both into and out of the machining station while locating each workpiece in a precisely established machining position prior to delivery of the workpiece to and clamping of the workpiece in the machining station for subsequent advance of the tool head and machining of the workpiece. In part, the foregoing ends are achieved through the provision of a novel loading carriage which not only locates each workpiece precisely in a loading station prior to delivering the same to the machining station for clamping and machining but which also is operable as an incident to such delivery to pick up a previously machined workpiece and to return such workpiece to a position adjacent the loading station for further transfer.

As a further advantageous feature of the invention, each machined workpiece is transferred laterally out of the machining station with the tool head itself and is positioned for pick up by the loading carriage as an incident to normal retraction of the tool head to retract the tool out of engagement with the workpiece.

The invention also resides in the provision of novel clamping cones on the loading carriage for locating and centering tubular workpieces in precisely established angular, radial and axial positions on the carriage, in the unique mounting of a workpiece supporting cradle on the tool head to enable the lateral transfer of machined workpieces from the machining station with the head when the latter is retracted, and in the coaction between the cradle, the loading carriage and novel elevator mechanism in the machining station to effect loading and unloading of machined workpieces onto and off of the cradle.

These and other objects and advantages of the invention will become more apparent from the following detailed description taken in conjunction with the accompanying drawings.

BRIEF DESCRIPTION OF THE DRAWINGS

FIG. 1 is a plan view of new and improved apparatus embodying the novel features of the present invention.

FIG. 2 is a front elevation of the apparatus shown in FIG. 1.

FIG. 3 is a side elevation of the apparatus shown in FIGS. 1 and 2.

FIG. 4 is a perspective view of an exemplary workpiece adapted to be handled by the apparatus.

FIG. 5 is an enlarged plan view of part of the loading carriage of the apparatus shown in FIG. 1.

FIG. 6 is an enlarged cross-section taken substantially along the line 6—6 of FIG. 5.

FIGS. 7 and 8 are fragmentary cross-sections taken substantially along the lines 7—7 and 8—8, respectively, of FIG. 5.

FIGS. 9 and 10 are enlarged cross-sections taken substantially along the lines 9—9 and 10—10, respectively, of FIG. 8.

FIG. 11 is an enlarged view of parts shown in FIG. 3 and illustrating the machining station, portions of the view being broken away and shown in section.

FIG. 12 is an enlarged cross-section taken substantially along the line 12—12 of FIG. 11.

FIG. 13 is an enlarged fragmentary cross-section taken substantially along the line 13—13 of FIG. 3 and showing certain parts in moved positions.

2

FIG. 14 is an enlarged fragmentary cross-section taken substantially along the line 14—14 of FIG. 13.

Figure 15:
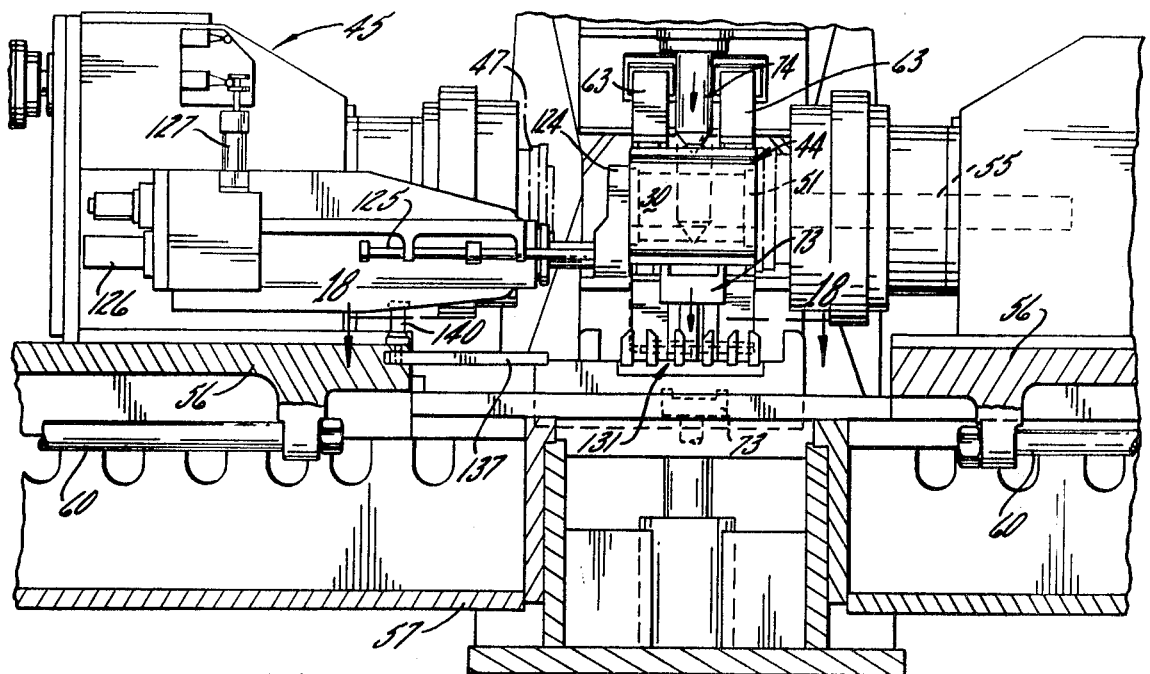

FIG. 15 is a fragmentary view similar to FIG. 13 but showing certain parts in moved positions.

Figure 16:
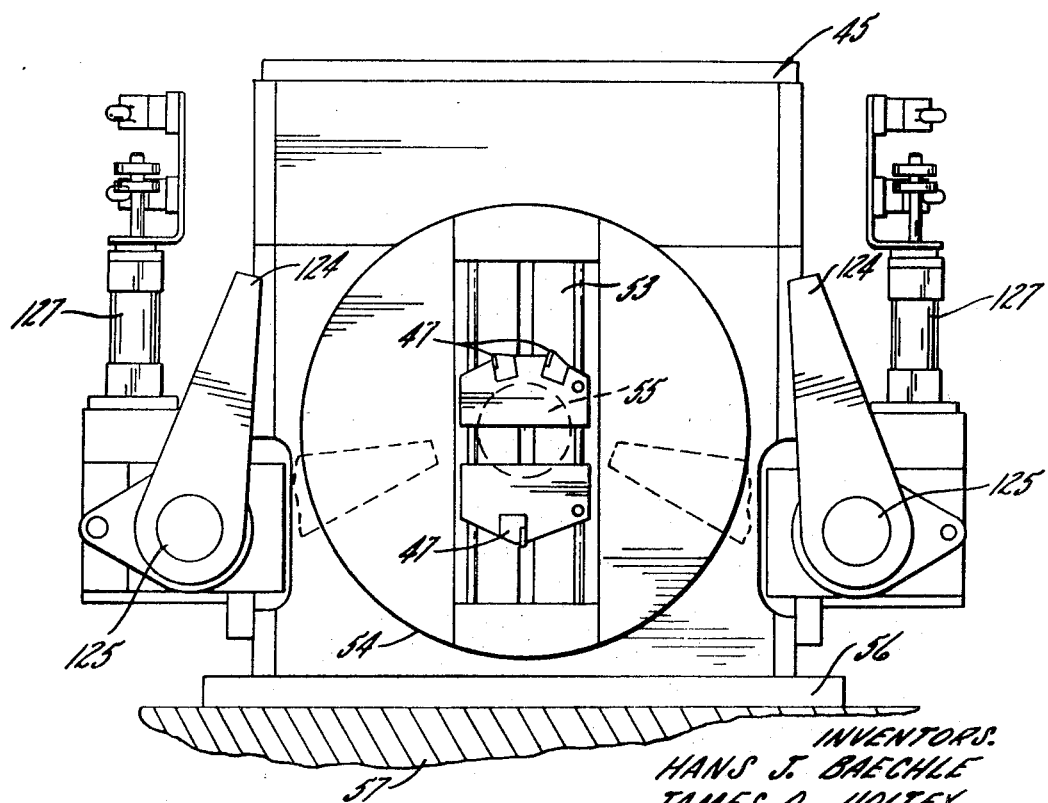

FIG. 16 is an enlarged fragmentary cross-section taken substantially along the line 16—16 of FIG. 13.

FIG. 17 is an enlarged view of parts illustrated in FIG. 7 but showing certain ones of the parts in moved positions.

FIG. 18 is a fragmentary cross-section taken substantially along line 18—18 of FIG. 15.

FIGS. 19 and 20 are enlarged fragmentary cross-sections taken substantially along the lines 19—19 and 20—20, respectively, of FIG. 18.

FIGS. 21 to 26 are simplified views of the apparatus schematically showing the positions of various parts of the apparatus during successive steps of a machining cycle.

FIG. 27 is an enlarged fragmentary cross-section taken substantially along the line 27—27 of FIG. 21.

DETAILED DESCRIPTION OF THE PREFERRED EMBODIMENT

For purposes of illustration, the invention is shown in the drawings incorporated in a machine tool organization for performing drilling, tapping, boring and milling operations on a workpiece 30 (FIG. 4) which herein is shown as an electric motor housing in the form of a tubular cylinder having four angularly spaced ribs 31 around its outer periphery. The workpiece as a whole has been designated by the reference numeral 30 and hereafter will be referred to as a cylinder. It is to be understood, however, that the invention is not limited to this type of workpiece nor to the particular character of the metal removing operations performed thereon, but is intended to cover all modifications and alternative constructions falling within the spirit and scope of the appended claims.

In the exemplary machine tool organization shown, a cylinder 30 is placed on a shiftable loading carriage 33 (FIG. 1) at a loading station 34, is advanced transaxially by the carriage first to a drilling station 35 where a hole 36 (FIG. 4) is drilled in a boss 37 in the upper side of the cylinder by a drilling unit 39 on a frame 40, and then is moved forwardly to a tapping station 41 where the hole is threaded by a tapping unit 43 which also is supported on the frame 40. The hole 36 subsequently receives a threaded hook (not shown) which may be grabbed for purposes of lifting the cylinder.

After being drilled and tapped, the cylinder 30 is shifted forwardly into and is clamped in a main machining or work station 44 (FIGS. 1 and 11). Here, the end portions of the cylinder are machined by left and right hand tool-carrying heads 45 and 46 (FIG. 1), respectively, adapted to be advanced toward opposite ends of the cylinder along a path extending transversely of the path followed by the cylinder in moving between the stations 34, 35, 41 and 44. By way of example only, the left hand head 45 is shown as carrying a set of cutters 47 (FIG. 16) for rough facing the extreme left end surface 49 (FIG. 4) of the cylinder and also for rough facing the surfaces of a so-called rabbet bore 50 in the left end portion of the cylinder, the rabbet bore subsequently receiving an end cap (not shown). The right hand head may carry cutters 51 (shown only generally in FIG. 1) for rough and finish boring the right end portion of the cylinder and also for facing the right end of the cylinder. In a well known manner, each set of cutters is mounted on a tool slide 53 (FIG. 16) which is adapted to be positioned radially along a face plate 54 coupled for rotation with a power driven spindle 55.

Each of the heads 45 and 46 is supported on a slide 56 (FIGS. 13 and 15) mounted for back and forth shifting on a bed structure which has been designated as a whole by the reference numeral 57 and which serves to support other elements of the machine tool organization as well as the heads. Also, electric motors 59 are supported on the slides for rotating the spindles 55. Reciprocating hydraulic actuators 60 are connected between the bed and each slide and are independently operable to advance the heads rapidly toward and to retract the heads rapidly away from the cylinder 30 clamped in the machining station 44, the actuators moving the heads between fully retracted positions shown in FIGS. 1, 2 and 22 and advanced positions shown in phantom in FIG. 13 and also serving to move the heads at a slower rate to position the heads properly during machining of the cylinder.

For the most part, clamping of each cylinder 30 in the machining station 44 is effected by four angularly spaced clamping mechanisms 61 (FIGS. 11 and 12) which each include left and right hand radially extending clamping arms 63 adapted to be advanced into clamping engagement with the outer cylindrical surface of the cylinder to hold the latter clamped in a predetermined position in the machining station while leaving the ends of the cylinder exposed for machining by the heads 45 and 46. Herein, the four clamping mechanisms are supported on a generally C-shaped frame 64 which partially embraces the machining station, the clamping mechanisms being arranged substantially in quadrature around the frame and serving to hold the cylinder in the machining station within the C-shaped opening of the frame. A typical one of the clamping mechanisms is shown in detail in FIG. 12 and includes a housing 65 adapted for mounting on the frame 64 formed with two side-by-side openings 66 which slidably receive the clamping arms 63. The latter are operably connected to lead screws 67 driven by reversible hydraulic motors 69 which may be energized to advance and retract the clamping arms into and out of clamping engagement with the cylinder.

In addition to being held in the machining station 44 by the radial clamping mechanisms 61, each cylinder 30 is engaged by upper and lower clamps 71 and 73 (FIG. 11) which are supported on the frame 64 above and below the cylinder. The upper clamp 71 includes a vertical plunger 74 with a coned end sized to wedge into the hole 36 in the upper side of the cylinder and adapted to be advanced into and retracted from the hole by a hydraulic actuator 75. The lower clamp 73 is formed by a platen or elevator (FIG. 14) secured to the upper end of a threaded rod 76 and movable upwardly and downwardly in response to the rotation of a nut 77 threaded on the rod. Rotation of the nut is effected by a reversible motor 79 which is connected to the nut through a shaft 80 and bevel gearing 81. Thus, the plunger 74 may be lowered downwardly into the hole 36 and the elevator 73 may be raised upwardly into engagement with the underside of the cylinder to assist the radial clamping mechanisms 61 in holding the cylinder during the machining operation.

In order to insure that the ends of the cylinder 30 will be faced squarely and bored concentrically to the proper dimensions by the heads 45 and 46, it is necessary to clamp the cylinder in a precisely located position in the machining station 44. That is, the cylinder must be clamped in the machining station with its axis centered both radially and angularly on the centerline of the cutter spindles 55 and with its ends located at predetermined axial positions along the centerline.

According to one aspect of the present invention, precise location of each cylinder 30 in the accurate position needed for machining in the machining station 44 is accomplished on the loading carriage 33 before delivery of the cylinder to the machining station and is effected by novel centering and clamping cones 83 (FIG. 5). The latter first telescope into and wedge within the ends of the cylinder while the loading carriage is retracted and the cylinder is in the loading station and, as a result of such telescoping, serve to center the cylinder radially and angularly as well as to clamp the cylinder in the proper endwise position. After the thusly located cylinder has been shifted forwardly into the machining station by the loading carriage and clamped by the radial clamping mechanisms 61, the centering cones 83 are withdrawn from the ends of the cylinder and are retracted from the machining station with the loading carriage to leave the cylinder clamped in a precise position and with its ends completely exposed for machining by the heads 45 and 46. In this way, advantage is taken of the loading carriage 33 not only to deliver the cylinders to the machining station but also to accurately locate the cylinders prior to such delivery and, in addition, one cylinder may be loaded and located in position on the loading carriage at the same time a preceding cylinder is being machined.

As shown most clearly in FIGS. 1 and 5, the centering cones 83 are disposed opposite one another near the forward end of the loading carriage 33 and are located on the carriage such that their axes lie parallel to and in the same horizontal plane as the centerline between the spindles 55 of the heads 45 and 46. Each cone comprises a supporting hub 84 (FIG. 6) and a generally frusto-conical clamping head 85, the latter being sized and shaped to wedge telescopically into the end of each cylinder 30. The hub of each cone is journaled by bearings 86 on a spindle 87 which is mounted for in and out sliding within a supporting housing 89 anchored to the loading carriage. To advance the cones into and withdraw the cones from the ends of the cylinder, racks 90 secured to the undersides of the two spindles 87 are driven by pinions 91 which are rotated by shafts 93 (FIG. 5) connected to a single reversible motor 94 by gearing 95. Energization of the motor 94 is partially controlled by limit switches 96 (FIG. 6) located on the right hand housing 89 for engagement and actuation by an elongated cam bar 97 carried by the spindle 87 within such housing.

Advantageously, the cones 83, after wedging into the ends of the cylinder 30, are capable of being rotated to enable turning of the cylinder to a predetermined angular position so that the cylinder may be oriented properly for drilling and tapping of the lift hold 36. After the cylinder has been oriented angularly, the cones are locked against further rotation to hold the cylinder in its selected angular position. To achieve the foregoing, the hub 84 of each cone 83 is coupled for rotation with a bushing 99 (FIG. 6) by radially extending and angularly spaced pins 100 (one pin being visible in FIG. 6). The bushing is telescoped over the outer end of the spindle and is of the so-called squeeze type, that is to say, the bushing is made of resiliently flexible material and by virtue of its own resiliency is normally contracted into gripping engagement with the spindle to lock the cone against rotation on the spindle. When it is desired to rotate the cone, fluid under pressure is delivered between the spindle and the bushing to expand the bushing and release the latter from the spindle thereby to free the cone for rotation on the spindle. When the pressure is released, the bushing automatically contracts to re-lock the cone to the spindle. The bushing is pressurized by way of a port 101 formed in the spindle and communicating with an axially extending passage 103 which slidably receives a tube 104 fastened to the outboard end of the housing 89 and communicating with a pressure source (not shown). A seal indicated generally at 105 in FIG. 6 prevents the leakage of fluid out of the passage 103 and along the tube 104 while permitting relative movement between the tube and the spindle when the cones are axially advanced and retracted.

In the operation of the apparatus as described thus far, a cylinder 30 to be machined is held in a sling (not shown) and is lowered by an overhead crane (not shown) into a position between the cones 83 while the latter are retracted away from one another and while the loading carriage 33 is in a retracted position in the loading station 34 as shown in FIGS. 1 and 21. As the cylinder reaches its lowered position, it engages an upright stop 106 (FIGS. 8 and 10) located between and below the cones and fastened to a shaft 107 which is mounted pivotally on the loading carriage by brackets 109. The stop 106 temporarily helps support the weight of the cylinder and locates the axis of the cylinder slightly below the centerline of the cones 83 such that, when the cones are advanced and wedged into the ends of the cylinder, the latter is lifted a slight distance upwardly by the cones to avoid any danger of a downward pull being exerted on the crane as an incident to the cones wedging into the cylinder.

Accordingly, with the cylinder 30 resting on the stop 106, the cones 83 are advanced toward one another by the motor 94 and, during such advance, the cones telescope into the ends of the cylinder and shift the latter endwise through the necessary distance to locate the cylinder at the proper axial position relative to the centerline of the spindles 55 of the heads 45 and 46. In addition, the cones wedge into the cylinder and, by virtue of their conical surfaces seeking seating engagement with the ends of the cylinder, shift the axis of the cylinder radially and angularly to center the cylinder exactly on a line parallel to the center line of the spindles and in the same horizontal plane as such centerline. Thus, the cylinder is precisely centered and located in a position to insure accurate machining of the ends of the cylinder in the machining station 44. As an incident to the cones becoming tightly wedged into the ends of the cylinder, the motor 94 stalls and is subsequently de-energized automatically.

After the cylinder 30 has been centered, the stop 106 is swung downwardly to an inactive position shown in phantom in FIG. 8 by a motor 110 (FIG. 10) connected to the shaft 107. Thereafter, pressure fluid is directed between the cone spindles 87 and the squeeze bushings 99 to free the cones 83 and the clamped cylinder for manual rotation to enable location of the cylinder in its proper angular position. Angular positioning of the cylinder is effected by turning the cylinder clockwise until the leading surface of the rib 31 thereof immediately adjacent the hole 36 engages and stops against a feeler 111 (FIG. 8) mounted on the loading carriage 33 and swingable downwardly toward the cylinder into an active position in the path of the large rib. The feeler is fast on a shaft 113 (FIG. 9) journaled by a bracket 114 on the loading carriage, and is adapted to be rocketed downwardly and upwardly between active and inactive positions by a hydraulic actuator 115 operable to reciprocate a rack 116 that meshes with a pinion 117 on the shaft 113.

Once the cylinder 30 has been turned to the proper angular position, the squeeze bushings 99 are allowed to contract to lock the cylinder against rotation, the feeler 111 is swung upwardly to an inactive position by the actuator 115, and the loading carriage 33 is advanced forwardly to transfer the clamped cylinder to the drilling station 35. As shown in FIGS. 5 and 7, the loading carriage is guided for forth and back movement by tubular ways 119 mounted on the bed 57 and is advanced and retracted by a reversible motor 120 secured to the loading carriage and operable to rotate a pinion 121 which meshes with a rack 123 secured to and extending along the bed.

After stopping the cylinder 30 first at the drilling station 35 and then at the tapping station 41 for drilling and tapping of the lift hole 36, the loading carriage 33 shifts the cylinder forwardly into the machining station 44 whereupon the radial clamping mechanisms 61 and the upper clamp 71 are advanced into clamping engagement with the cylinder while the latter is still held by the cones 83 (see FIG. 11). Thus, the cylinder is securely clamped in the machining station in the same precisely located position previously established by the cones with the cylinder positioned in the loading station 34. Thereafter, the cones are withdrawn from the ends of the cylinder by the motor 94, and the loading carriage is shifted back to the loading station to retract the cones out of the paths of the heads 45 and 46 and to leave the ends of the cylinder exposed for machining.

With the cylinder 30 clamped in the machining station 44, the heads 45 and 46 are advanced toward the cylinder to position the cutters 47 and 51 in proximity to the ends of the cylinder. In an exemplary machining cycle, a rough boring operation first is performed on the right end portion of the cylinder by the cutters 51 of the right head 46 while the cutters 47 of the left head 45 are held out of engagement with the left end of the cylinder. During rough boring, two support arms 124 (FIGS. 15 and 16) on the slide 56 of the left head are positioned against the left end of the cylinder to help prevent the latter from being shifted endwise by the force applied against the cylinder by the cutters 51. The support arms 124 are disposed on opposite sides of the left slide 56 and are mounted on rods 125 to shift on the slide toward and away from the cylinder and also to turn downwardly and upwardly between active positions ahead of the cutters 47 and inactive positions extending upwardly alongside and spaced clear of the cutters (as shown in phantom and in full in FIG. 16). An actuator 126 (FIG. 15) connected to each rod 125 is operable to advance and retract the associated support arm while an actuator 127 is operable to rotate the rod to turn the arm between its active and inactive positions. Accordingly, the arms may be positioned in engagement with the left end of the cylinder while the right end thereof is being rough bored (see FIG. 15), and then may be turned to their inactive positions and retracted to locations behind the cutters 47 to permit advancement of the latter into engagement with the left end of the cylinder (see the phantom illustration of FIG. 13).

When the rough boring of the right end of the cylinder 30 is completed, both the left and right cutters 47 and 51 are moved into position to face the two ends of the cylinder simultaneously as shown in phantom in FIG. 13. Thereafter, the left cutters are retracted a short distance from the cylinder and a finish boring operation is performed on the right end of the cylinder by the right cutters 51. During the finish boring, the right hand clamping arms 63 of the radial clamping mechanisms 61 are retracted from the cylinder as shown in FIG. 13 so that the latter will be free to expand to its natural, unstressed shape and enable finish boring of the cylinder to the proper dimensions and concentricity. Once all of the various metal removing operations performed in the machining station 44 have been completed, the machined cylinder is unclamped and transferred out of the machining station and the two heads are shifted to their fully retracted positions preparatory to the delivery of the next cylinder to the machining station.

According to another aspect of the invention, each machined cylinder 30 is automatically transferred laterally out of the machining station 44 with the tool head 45 as an incident to retracting the head away from the station after completion of the machining operation. Moreover, the loading carriage 33 picks up the machined cylinder as the carriage moves forwardly to deliver the next unmachined cylinder to the machining station, and then retracts the machined cylinder to an unloading station 130 (FIGS. 1 and 26) disposed alongside the loading station 34 in such a position that the same crane and sling used for loading unmachined cylinders onto the carriage can be easily used for lifting machined cylinders off of the carriage.

More specifically, each machined cylinder 30 is transferred laterally and endwise out of the the machining station 44 by a cylinder support or cradle 131 (FIGS. 1 and 18) attached to and projecting ahead of the slide 56 which supports the left tool head 45. As shown most clearly in FIG. 18, the cradle comprises a series of six vertically disposed and side-by-side plates 133 which are interconnected on their lower sides by frame strips 134. The upper edges of the plates are inclined as indicated at 134 in FIG. 17 to form a generally V-shaped seat upon which the cylinder may rest without rolling off of the plates. For a purpose to be described subsequently, the two centermost plates are interrupted thus causing the cradle to be formed with a centrally located vertical opening 135 (FIG. 18) which extends completely through the cradle. In addition, the plates are spaced apart from one another so that a series of upwardly opening slots 136 extending transversely of the cradle are defined between the plates.

To support the cradle 131 on the slide 56, two bars 137 connected to the frame strips 134 extend from the left end of the cradle and are fitted into sockets 139 formed in the leading end of the slide (see FIGS. 18 and 20). The cradle is adapted to be coupled to the slide to advance and retract in unison with the latter and also is adapted to be uncoupled from the slide so that the slide can be moved independently of the cradle. For these purposes, hydraulic actuators 140 are mounted on the slide and include reciprocating plungers 141 (FIG. 20) which extend downwardly into the sockets 139 and into holes 143 formed in the end portions of the bars 137. When extended, the plungers fit into the holes 143 to couple the cradle for movement with the slide 56 and, when retracted, the plungers are withdrawn from the holes to allow the slide to move without moving the cradle.

With the foregoing arrangement, the cradle 131 is coupled to the slide 56 by the actuators 140 when the left head 45 is in its fully retracted position as shown in FIG. 1 prior to being initially advanced toward a newly clamped, unmachined cylinder 30 in the machining station 44. After the cylinder has been clamped by the radial clamping mechanisms 61, the cradle 131 moves with the left head 45 during the initial advance of the latter toward the cylinder and is shifted to a position underlying but spaced below the unmachined cylinder clamped in the machining station as shown in FIGS. 11, 15 and 27. During the advance of the cradle, the elevator 73 is disposed in a lowered position spaced below the cradle (see FIGS 11 and 14) so as to enable shifting of the cradle beneath the cylinder. Once the cradle has been positioned properly, the elevator is raised upwardly into engagement with the cylinder (see FIG. 15), moving upwardly through the centrally located opening 135 in the cradle, and thus coacts with the radial clamping mechanisms 61 to keep the cylinder supported in a position spaced vertically from the cradle.

After being shifted to an advanced position beneath the clamped cylinder 30, the cradle 131 is locked against movement from the advanced position. As shown in FIG. 19, rails 144 underlie and support the cradle when the latter is in its advanced position. Locking of the cradle in such position is effected by a reciprocating actuator 147 supported on one of the rails and having a plunger 149 adapted to extend into a hole 151 in one of the frame strips 134 of the cradle. Thus, extension and retraction of the plunger 149 results in locking and unlocking of the cradle when the latter is beneath the clamped cylinder.

After being locked in its advanced position, the cradle 131 is uncoupled from the left slide 56 by the actuators 140 so that the slide can advance and retract as necessary during machining of the cylinder 30 by the cutters 47 but without shifting the cradle. Thus, the cradle is held stationary during the machining, and the elevator 73 may remain in its raised position with its supporting rod 76 extending upwardly through the opening 135 in the cradle.

Upon completion of the machining, the clamping arms 63 of the radial clamping mechanisms 61 first are retracted away from the machined cylinder 30 to leave the latter resting on the elevator 73 and held by the plunger 74 of the upper clamp 71. Thereafter, the elevator is shifted downwardly to lower the cylinder onto the cradle (see FIG. 27), the cylinder coming to rest on the cradle as the elevator passes downwardly into and through the opening 135. As the elevator is lowered, the plunger 74 of the upper clamp 71 remains in the lift hole 36 and follows the cylinder downwardly to hold the latter on the elevator, and then is retracted after the cylinder has come to rest on the cradle. The cradle then is unlocked by the actuator 147 and is coupled to the slide 56 by the actuators 140. Finally, the slide is moved to its fully retracted position (FIG. 1) to retract the left head 45 and the cutters 47 and, as an incident to such retraction, the cradle and the machined cylinder resting thereon are shifted laterally out of the machining station 44 to a position spaced laterally from the machining station and the radial clamping mechanisms 61 (see FIG. 22). Accordingly, retraction of the slide 56 and the left tool head 45 also serves to transfer the machined cylinder laterally out of the machining station.

As mentioned above, the machined cylinder 30 transferred laterally out of the machining station 44 by the cradle 131 is picked up by the loading carriage 33 as the latter is shifted forwardly to deliver the next unmachined cylinder to the machining station. For this purpose, a fork lift 155 (FIGS. 5 and 17) is mounted on the forward end of the loading carriage and is operable first to move beneath the machined cylinder on the cradle when the loading carriage is advanced, then to lift the cylinder upwardly off of the cradle and finally to carry the cylinder back to the unloading station 130 when the loading carriage is retracted.

As shown most clearly in FIGS. 5 and 17, the fork lift 155 comprises a platform or fork formed by a series of horizontally spaced and forwardly projecting prongs 156 carried on a bar 157 which is guided for up and down sliding on the forward end of the loading carriage 33 by sleeves 159 and rods 160. A reciprocating actuator 161 is connected between the carriage and the bar for purposes of moving the fork 155 between lowered and raised positions as shown in full and phantom, respectively, in FIG. 17. To hold the machined cylinder on the fork, an arm 163 is mounted swingably on the forward end of the loading carriage 33 at 164 and is connected to a motor 165 operable to swing the arm between a raised, inactive position as shown in phantom in FIG. 7 and a lowered position as shown in full. When the arm is in its lowered position, lugs 166 on the arm straddle the upper side of the cylinder 30 on the fork 155 and keep the cylinder from rolling off of the fork.

During the initial forward advance of the loading carriage 33 to deliver a cylinder 30 to the machining station 44, the fork 155 is disposed in its lowered position and the arm 163 is disposed in its upper, inactive position. With continued advance of the carriage, the fork approaches the retracted cradle 131, and the prongs 156 move beneath the machined cylinder by sliding endwise into the slots 136 between the plates 133 of the cradle as shown in full in FIG. 17. Thereafter, the fork 155 is raised by the actuator 161 to lift the cylinder upwardly off of the cradle with the prongs 156 passing upwardly through the open upper ends of the slots 136 as shown in phantom in FIG. 17. As soon as the cylinder is lifted from the cradle, the arm 163 is swung downwardly by the motor 165 to hold the cylinder on the fork. During the subsequent retraction of the loading carriage to receive still another unmachined cylinder, the machined cylinder on the fork is retracted to the unloading station 130 from where the cylinder may be lifted off of the fork by the sling.

SUMMARY OF OPERATION

The operation of the overall machine tool organization best may be summarized briefly with reference to FIGS. 21 to 27 which schematically show the sequential steps of an operating cycle. Let it be assumed that initially the loading carriage 33 is in a retracted position in the loading station 34 as shown in FIG. 21 with the centering cones 83 retracted away from one another and with the fork 155 in a lowered position. Assume further that the heads 45 and 46 have been advanced into the positions shown in FIG. 21 to machine a cylinder 30 in the machining station 44, that such cylinder is held by the radial clamping mechanisms 61, the upper clamp 71 and the elevator 73, and that the cradle 131 is positioned beneath the clamped cylinder.

While the clamped cylinder 30 is being machined by the heads 45 and 46, an unmachined cylinder held in the sling is lowered between the cones 83 at the loading station 34 as shown in FIG. 21 and is centered and oriented angularly by first advancing the cones into wedging engagement with the ends of the cylinder and by then turning and locking the cones. Also, during the machining of the clamped cylinder, the loading carriage 33 may be shifted forwardly to the drilling and tapping stations 35 and 41 as shown in FIG. 22 for drilling and tapping of the lift hole 36 in the cylinder held between the cones.

Upon completion of the machining of the clamped cylinder 30 in the machining station 44, the radial clamping mechanisms 61 are retracted and the cylinder is lowered downwardly onto the underlying cradle 131 by the elevator 73. (see FIG. 27). The heads 45 and 46 then are retracted fully as shown in FIG. 22 with the cradle 131 being retracted with the left head 45 and carrying the machined cylinder laterally out of the machining station. Next, the loading carriage 33 is advanced until the fork 155 moves beneath the machined cylinder by interfitting with the retracted cradle 131 (see FIG. 23). At this time, the unmachined cylinder 30 held in the cones is positioned just short of the machining station 44.

After the fork 155 has been raised to lift the machined cylinder 30 off of the cradle 131, the arm 163 is swung downwardly to keep the cylinder from rolling off of the fork. The loading carriage 33 then is advanced further to deliver the unmachined cylinder into the machining station 44 as shown in FIG. 24, the machined cylinder on the fork 155 being moved forwardly past the cradle 131 as the unmachined cylinder is delivered into the machining station. The unmachined cylinder then is clamped in its accurately located position by the radial clamping mechanisms 61 and the upper clamp 71, the cones 83 are withdrawn from the ends of the cylinder, and the loading carriage begins retracting as shown in FIG. 25. As soon as the fork 155 clears the cradle 131, the heads 45 and 46 are advanced toward the newly clamped cylinder 30 (see FIG. 26) with the cradle moving beneath the cylinder and with the elevator 73 subsequently being moved upwardly through the opening 135 in the cradle and into engagement with the underside of the clamped cylinder.

As the loading carriage 33 reaches its fully retracted position to receive still another cylinder 30, the machined cylinder on the fork 155 is carried to the unloading station 130 (see FIG. 26) from where it is lifted off of the fork by the sling after the retaining arm 163 has been raised. Lowering of the fork then completes one cycle of operation.

Accordingly, it is apparent that the loading carriage 33 not only accurately locates unmachined cylinders 30 and delivers the same to the machining station 44 but also picks up and returns machined cylinders which are advantageously transferred laterally out of the machining station as an incident to normal retraction of the tool head 45. These ends are attained as a result of the cones 83, the radial clamping mechanisms 61, the elevator 73, the cradle 131 and the fork 155 coacting with one another during various steps of the cycle to facilitate handling of the cylinders.

We claim:

1. Apparatus for machining a workpiece in a machining station and for transferring the workpiece from the station, the combination of, means in the station for supporting and clamping the workpiece in a preselected position in the station, a head mounted for movement toward and away from said station and supporting a tool for performing a machining operation on the workpiece, a workpiece support located below said tool and movable with said head toward and away from said station, mechanism for advancing said head toward a clamped workpiece to bring said tool toward engagement with the workpiece and to position said support beneath the workpiece, and said mechanism including means operable after completion of the machining operation and unclamping of the workpiece for retracting said head to retract said tool and to shift said support with the machined workpiece thereon away from and out of said station.

2. Apparatus as defined in claim 1 in which said clamping and supporting means include an elevator movable upwardly and downwardly within said machining station, and means operable first to raise said elevator into engagement with the underside of a workpiece in said station and operable after completion of the machining operation and before retraction of said head to lower said elevator and thereby lower said workpiece downwardly onto said support.

3. Apparatus as defined in claim 2 in which said workpiece support includes an upright opening extending therethrough, said elevator being movable upwardly through said opening and into engagement with the workpiece after said head has been advanced to position said support beneath the workpiece.

4. Apparatus as defined in claim 3 further including a slide for supporting said head and said workpiece support and movable with the head and the workpiece support toward and away from said machining station, and means for coupling said workpiece support to said slide during the initial advance of the latter to position said workpiece support beneath the clamped workpiece and for thereafter uncoupling said workpiece support from said slide to enable advancement of the head and the slide independently of the workpiece support.

5. Apparatus as defined in claim 1 further including a loading carriage movable toward and away from said machining station along a path extending transversely of the path of movement of said head, and means on said carriage for supporting a workpiece for delivery to said station during the forward stroke of said carriage.

6. Apparatus as defined in claim 5 further including means movable with said loading carriage for picking up a machined workpiece off of said workpiece support while the latter is retracted and as said carriage is advanced through its forward stroke to deliver a succeeding workpiece to said machining station, said pick up means being operable to carry the machined workpiece away from said workpiece support as said carriage is retracted from the work station to receive still another workpiece.

7. Apparatus as defined in claim 6 in which said pick up means comprises a platform operable to move beneath a machined workpiece on said support during the forward stroke of said loading carriage, and mechanism on said carriage for lifting said platform after the platform has been positioned beneath the machined workpiece thereby to raise the latter from said support prior to retraction of the carriage.

8. Apparatus as defined in claim 7 in which said platform comprises a fork with a series of horizontally spaced and horizontally projecting prongs, and a series of upwardly and horizontally opening slots formed in said workpiece support for receiving said prongs during the forward stroke of said loading carriage thereby to enable positioning of the prongs beneath a machined workpiece.

9. Apparatus as defined in claim 7 in which said pick up means further includes an arm spaced above said platform and mounted on said loading carriage for up and down movement, and means for moving said arm downwardly into engagement with the upper side of a machined workpiece after said platform has been moved beneath the workpiece thereby to clamp the workpiece onto the platform.

10. Apparatus as defined in claim 5 in which said tool machines an end portion of each workpiece in the machining station, said means on said loading carriage comprising a pair of clamps movable toward and away from another on the carriage along paths paralleling the path of movement of said head, mechanism operable when said carriage is retracted to move said clamps toward one another and into clamping engagement with the end portions of a workpiece positioned between the clamps thereby to hold the workpiece securely on the carriage for delivery to said work station, said last-mentioned mechanism being operable after clamping of said workpiece in said work station by said clamping means to withdraw said clamps from the end portions of the workpiece to enable retraction of said carriage and said clamps from the machining station with such retraction being followed by advance of said tool into engagement with said one end portion of the workpiece.

11. Apparatus as defined in claim 10 in which said tool machines the end portion of a tubular workpiece, said clamps comprising cones sized to telescope into and wedge within the end portions of the workpiece to center and clamp the latter in an accurately located position for delivery to and clamping and machining in said machining station.

12. Apparatus as defined in claim 11 in which said cones are rotatably mounted on said loading carriage to turn about their own axes and are capable of being rotated after wedging into the workpiece thereby to enable turning of the clamped workpiece into a a predetermined angular position, and means for locking said cones against rotation after turning of the workpiece to said predetermined position thereby to hold said workpiece in such position during delivery to said machining station.

13. Apparatus for transferring a workpiece with recessed ends into a machining station and for machining an end portion of the workpiece in the station, the combination of, a loading carriage movable toward and away from said machining station, a pair of clamping cones mounted on said carriage for movement toward and away from one another along paths extending transversely of the path of movement of the carriage, mechanism operable when said carriage is retracted away from said station to move said cones toward one another and into telescoping wedging engagement with the end portions of a workpiece disposed between the cones thereby to center and clamp the workpiece in an accurately located position, means for thereafter shifting said carriage toward said station to deliver the workpiece into the station, means in said station for clamping against the periphery of the workpiece in the station while the latter is held by said cones thereby to clamp the workpiece in said accurately located position independently of the cones, means operable after clamping of the workpiece in the station for withdrawing said cones from the ends of the workpiece and for retracting said carriage away from said station, a head mounted for movement toward and away from said machining station along a path extending transversely of the path of movement of said carriage and supporting a tool for performing a machining operation on one end portion of the workpiece, and means operable after retraction of said carriage for advancing said head toward said station to bring said tool into operative engagement with said one end portion of said workpiece.

14. Apparatus as defined in claim 13 further including a workpiece support located beneath said tool and movable with said head into underlying relation with the workpiece in the machining station as said head is advanced to bring said tool toward engagement with the workpiece, and means operable after completion of the machining operation and unclamping of the workpiece in the machining station to retract said head thereby to retract said tool and to shift said support with the machined workpiece thereon away from and out of said machining station.

15. Apparatus as defined in claim 14 further including means movable with said loading carriage for picking up the machined workpiece off of said workpiece support while the latter is retracted and as said carriage is advanced to deliver a succeeding workpiece to the machining station, said pick up means being operable to carry the machined workpiece away from said workpiece support as said carriage is retracted away from said machining station to receive still another workpiece.

16. Apparatus as defined in claim 13 in which said cones are rotatably mounted on said loading carriage to turn about their own axes and are capable of being rotated after wedging into the end portions of the workpiece thereby to enable turning of the clamped workpiece into a predetermined angular position on the carriage, and means for locking said cones against rotation after turning of the workpiece to said predetermined position thereby to hold said workpiece in such position during delivery to said machining station.

17. In a machine tool apparatus for machining the recessed ends of successive workpieces, the combination of, a bed structure, a carriage slidable thereon forth and back along a rectilinear path between workpiece loading and machining stations, positioning means on said carriage movable relative thereto into and out of the recessed ends of said workpiece to locate the latter accurately relative to the carriage and to release the workpiece, a clamp at said machining station for receiving the workpiece presented thereto in the advance of said carriage and for holding the workpiece accurately positioned after release of said positioning means, a head movable laterally of said path and having a power driven tool thereon for machining one end of the clamped workpiece during the head advance, a cradle mounted on said head for movement in beneath the clamped workpiece as an incident to advance of said head and operable to receive such workpiece upon release of said clamp and carry the workpiece laterally of said path and out of said machining station, and means on said carriage operable during the next advance thereof to pick the machined workpiece off from said cradle and operable to carry the machined workpiece back toward said loading station during retraction of the carriage.

* * * * *